United States Patent
Baccouche et al.

(10) Patent No.: US 10,005,349 B2
(45) Date of Patent: Jun. 26, 2018

(54) STRUCTURAL UNDERBODY SUPPORT IN A VEHICLE

(71) Applicant: FORD GLOBAL TECHNOLOGIES, LLC, Dearborn, MI (US)

(72) Inventors: Mohamed Ridha Baccouche, Ann Arbor, MI (US); Saeed David Barbat, Novi, MI (US); Rahul Arora, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 14/982,091

(22) Filed: Dec. 29, 2015

(65) Prior Publication Data

US 2017/0182873 A1  Jun. 29, 2017

(51) Int. Cl.
| | |
|---|---|
| *B60K 1/04* | (2006.01) |
| *B62D 25/20* | (2006.01) |
| *B62D 25/08* | (2006.01) |
| *B60R 19/02* | (2006.01) |
| *B62D 21/15* | (2006.01) |
| *B62D 65/16* | (2006.01) |

(52) U.S. Cl.
CPC .............. *B60K 1/04* (2013.01); *B60R 19/023* (2013.01); *B62D 21/155* (2013.01); *B62D 25/087* (2013.01); *B62D 25/2027* (2013.01); *B62D 65/16* (2013.01); *B60K 2001/0416* (2013.01); *B60K 2001/0438* (2013.01); *B60Y 2306/01* (2013.01)

(58) Field of Classification Search
CPC .............. B60K 1/04; B60K 2001/0416; B60K 2001/0438; B62D 25/2027; B62D 65/16; B62D 21/155
See application file for complete search history.

(56) References Cited

U.S. PATENT DOCUMENTS

| | | | | |
|---|---|---|---|---|
| 2,864,647 A | * | 12/1958 | Chesna ................. | B62D 21/06 280/793 |
| 4,045,075 A | * | 8/1977 | Pulver ................... | B62D 21/08 280/798 |
| 5,259,661 A | * | 11/1993 | Thum .................... | B62D 21/08 296/203.01 |
| 5,466,005 A | * | 11/1995 | Kohlmeier ............... | B60G 7/02 180/311 |

(Continued)

FOREIGN PATENT DOCUMENTS

| | | |
|---|---|---|
| JP | 2011005997 A | 1/2011 |
| JP | 2013103635 A | 5/2013 |

*Primary Examiner* — Frank B Vanaman
(74) *Attorney, Agent, or Firm* — Jason Rogers; Brooks Kushman P.C.

(57) ABSTRACT

A vehicle frame and underbody assembly includes a pair of longitudinal frame rails and a rear bumper assembly connected to the frame rails via crush cans. A panel is secured to the frame rails, and ends at an edge spaced from the rear bumper assembly. A V-brace is mounted beneath the panel and to the frame rails. The V-brace includes two legs that come together and intersect at a first end at the edge of the panel, and that are spaced apart at a second end. The second end of each leg is secured to a cross-member that spans between and connects the second ends of the legs. A traction battery is secured to the panel in a location at least partially directly above the V-brace.

15 Claims, 3 Drawing Sheets

(56) References Cited

U.S. PATENT DOCUMENTS

| | | | |
|---|---|---|---|
| 5,803,533 A * | 9/1998 | Schulz | B62D 21/00 |
| | | | 296/204 |
| 7,032,961 B2 | 4/2006 | Matsuda | |
| 7,201,433 B2 * | 4/2007 | Herntier | B62D 21/152 |
| | | | 296/187.03 |
| 7,338,115 B2 | 3/2008 | Rocheblave et al. | |
| 7,568,755 B2 | 8/2009 | Imada et al. | |
| 7,905,541 B2 | 3/2011 | Yamaguchi et al. | |
| 8,011,695 B2 * | 9/2011 | Kosaka | B62D 25/2018 |
| | | | 280/784 |
| 8,303,030 B2 * | 11/2012 | Baccouche | B60R 19/24 |
| | | | 296/203.01 |
| 8,602,454 B1 | 12/2013 | Baccouche et al. | |
| 8,657,369 B2 | 2/2014 | Mildner et al. | |
| 8,708,401 B2 | 4/2014 | Lee et al. | |
| 2003/0070858 A1 * | 4/2003 | Kondo | B60K 1/04 |
| | | | 180/291 |
| 2006/0061143 A1 * | 3/2006 | Okana | B62D 21/10 |
| | | | 296/204 |
| 2007/0096508 A1 * | 5/2007 | Rocheblave | B62D 21/152 |
| | | | 296/193.07 |
| 2008/0283317 A1 | 11/2008 | Wagner et al. | |
| 2009/0166116 A1 * | 7/2009 | Kiya | B60K 1/04 |
| | | | 180/68.5 |
| 2014/0008137 A1 | 1/2014 | Shiromura et al. | |

* cited by examiner

STRUCTURAL UNDERBODY SUPPORT IN A VEHICLE

TECHNICAL FIELD

This disclosure relates to underbody support structure in a vehicle.

BACKGROUND

Current vehicle frames at their rear include a pair of frame rails, and a pair of secondary rails that are inboard of the frame rails. The secondary rails are generally parallel with the frame rails to transfer loads from a rear impact toward the front of the vehicle.

SUMMARY

According to one embodiment, a vehicle includes a rear bumper beam, a pair of frame rails secured to the bumper beam, and a cross-member connecting the frame rails. A V-brace is also included. The V-brace has two legs with first ends that intersect and second ends that are spaced apart. Each of the first ends is secured to the other of the legs, and each of the second ends are secured to the cross-member and one of the frame rails.

A floor panel may be secured below the frame rails, the cross-member, and the V-brace. A traction battery may be secured above the floor panel at a location vertically aligned with the V-brace.

The cross-member may include a flange extending along a length thereof, and each of the legs may include a first flange extending along a length thereof that is secured to the flange of the cross-member.

The frame rails may each include a flange extending along a length thereof, and each of the legs may include a second flange extending along the length thereof that is secured to the flange of one of the frame rails.

The vehicle may also include one or more additional cross-members connecting the frame rails, wherein the V-brace is secured to the cross-member and not to the additional cross-members. The cross-member may include two half-members secured to one another, with each of the legs being secured to one of the two half-members.

Each of the legs may have an upper side and a lower side, the upper side being secured to a floor panel and having a first width, and the lower side being spaced from the upper side and has a second width less than the first width. The first end of the V-brace may be defined by an intersection of the two legs, and the first end may have a width less than the first width of the upper side of each of the legs.

According to another embedment, a frame structure for a vehicle includes a pair of frame rails, a rear bumper beam coupled to the frame rails, and a cross-member coupled to the frame rails. The frame structure also includes a pair of V-brace members each having first and second ends, with the first ends intersecting and being spaced apart from the bumper beam, and the second ends being spaced from one another and each directly connecting with the cross-member and one of the frame rails.

According to yet another embodiment, a method of manufacturing a vehicle underbody assembly includes securing a cross-member to first and second frame rails, securing one leg of a V-brace to the cross-member and to the first frame rail, and another leg of the V-brace to the cross-member and to the second frame rail, and securing a bumper beam to the frame rails such that the bumper beam is spaced from an intersecting region of the legs. Finally, a battery may be mounted to a floor panel at a location directly aligned and above with the V-brace.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A frame of a vehicle typically includes a pair of frame rails that extend along the length of the vehicle. The frame rails are spaced apart from one another, but can be connected by one or more cross members extending transverse to the frame rails and across the frame. A rear bumper assembly may be connected to the frame rails. Various embodiments of structural support between the rear bumper assembly and the cross member have been implemented. In one implementation, one or more longitudinal rails are placed inboard of the frame rails and extend in generally the same direction, i.e., along the length of the vehicle. These inboard rails may also connect to the cross member. In the event of a collision from the rear of the vehicle, load can be transferred along the inboard rails and to the cross-member. With this configuration, the cross member can buckle and bend under the axial load transferred by the two inboard rails.

According to various embodiments described below, a V-brace is incorporated into the frame, between the cross member and the rear bumper assembly. The V-brace can provide a substitute structure that creates a different load path than the previous longitudinal inboard rails. The load can place the cross member in tension, which can reduce buckling and bending of the attached floor. Additional description of various embodiments of this invention is provided below, with reference to the figures for exemplary illustrations.

Figure 1:
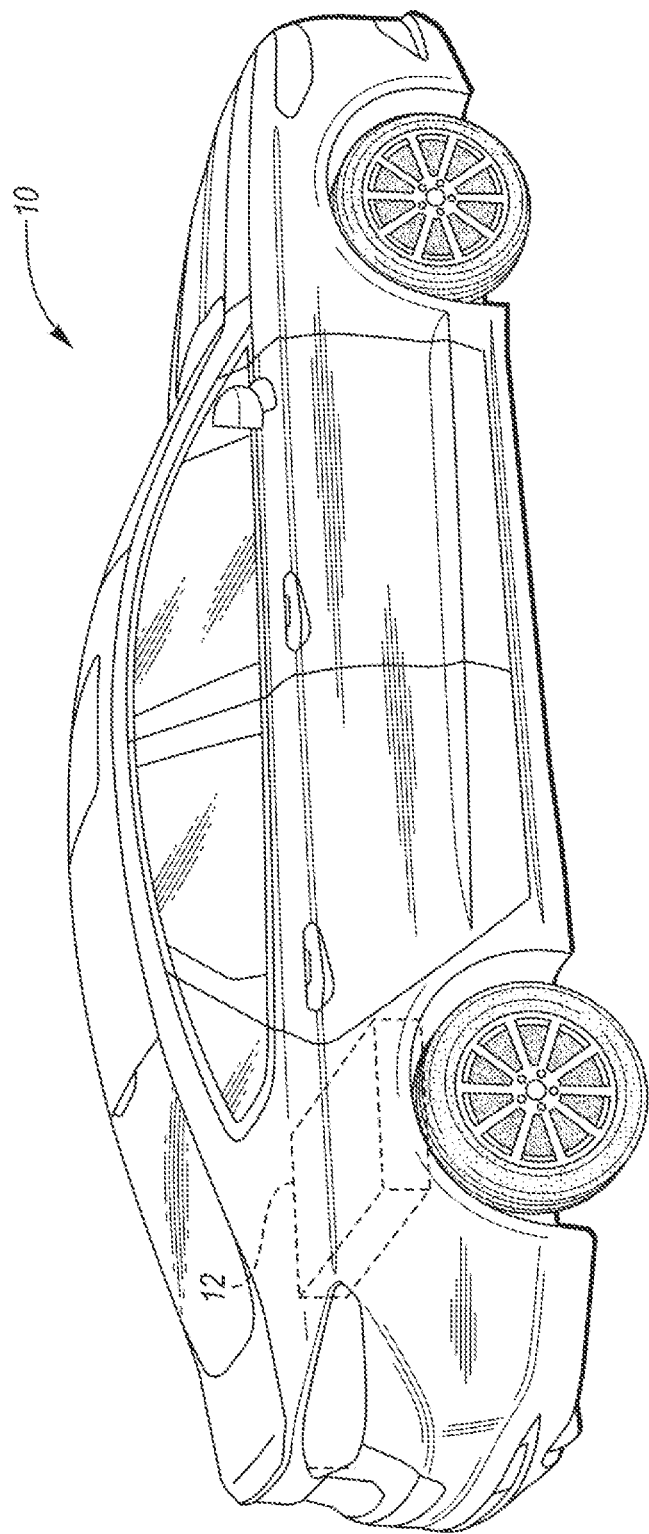
FIG. 1 is a side perspective view of a vehicle illustrating a typical location of a traction battery in a hybrid vehicle, according to one embodiment.

FIG. 1 illustrates a vehicle 10. The vehicle 10 is a hybrid vehicle having a traction battery 12 for at least partially propelling the vehicle 10. According to one embodiment, the traction battery is located to the rear of the rear seats of the vehicle, above the vehicle underbody. During a collision, it is desirable that the traction battery 12 remains protected, especially if the collision is from the rear of the vehicle. Various embodiments of an underbody support structure are shown in the remaining figures for protecting the traction battery in the event of a collision.

Figure 2:
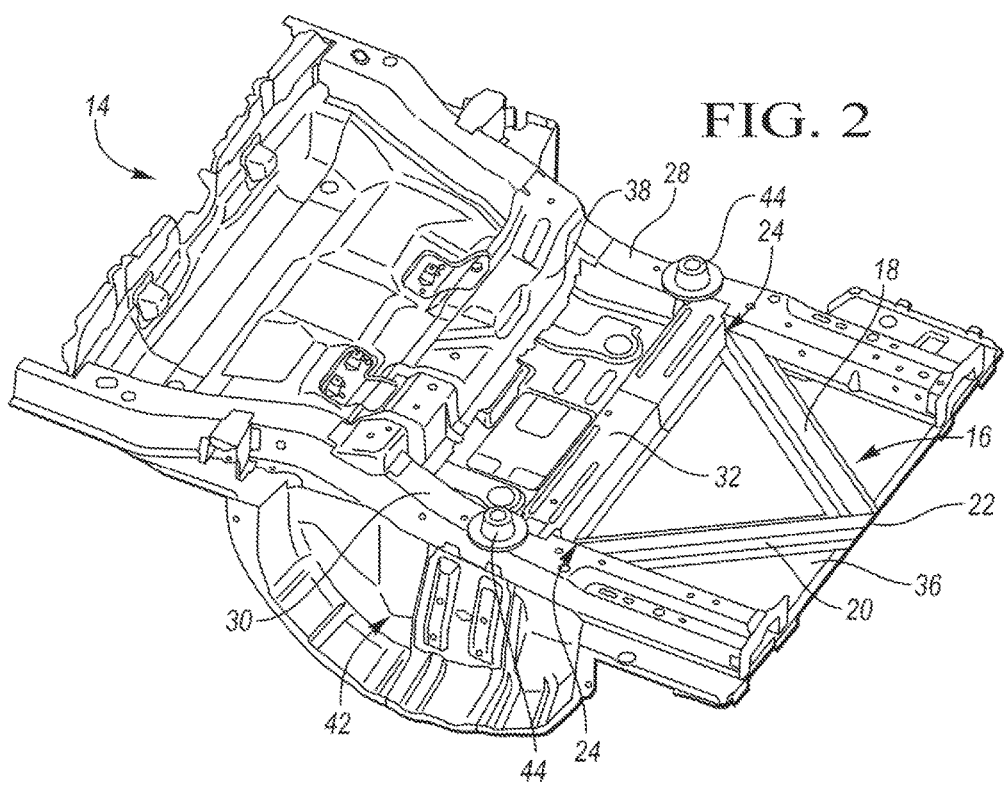
FIG. 2 is a perspective view of an underbody of a vehicle looking up toward the bottom of the vehicle, with the underbody incorporating a V-brace support according to one embodiment.

Referring to the embodiment illustrated in FIG. 2, an underbody 14 of the vehicle 10 is shown. The view shown in this Figure (as well as FIGS. 3 and 4) is from underneath the vehicle and looking upward. The underbody 14 includes a V-brace 16 support structure. The V-brace 16 is a support member in a general shape of a "V," in that the V-brace includes two legs 18, 20 that intersect at one end 22 of the V-brace and are spaced apart at another end 24 of the V-brace. In the embodiment shown in FIG. 2, a first end 22 of the V-brace member 16 is toward the rear of the vehicle with the two legs intersecting at a point or region, and a second end 24 of the V-brace member 16 is more forward of the first end 22 with the two legs 18, 20 spaced from one another. In other embodiments, the first end of the V-brace is more towards the front of the vehicle rather than the rear. That embodiment can be implemented in a front bumper assembly, for example, rather than the rear bumper assembly shown in this Figure.

The underbody 14 includes a pair of spaced apart, longitudinal frame rails 28, 30. One leg 18 of the V-brace 16 is connected to one of the frame rails 28, and the other leg 20 of the V-brace 16 is connected to the other frame rail 30. A cross-member 32 is also connected to the frame rails, and to each leg of the second end of the V-brace. At each end of the cross-member 32, all three of the cross-member, the V-brace, and the frame rail are connected to one another. This will further be described with reference to FIG. 3.

The underbody 14 also includes a panel 36 that is secured to the upper side of the frame rails, the V-brace, and the cross member. The panel 36 is a stamped sheet that supports the floor of the vehicle 10. The view shown in FIG. 2 is from beneath the underbody; in a completed vehicle assembly, the panel is secured to the upper sides of the support structure relative to the ground beneath the vehicle.

A second cross-member 38 may also be included in the underbody support structure. The second cross-member 38 is spaced from, forward of, and generally parallel to the first cross-member 32. The second cross-member 38 provides additional support to the frame rails, but does not secure to the V-brace.

Wheel wells 42 are also provided on the underbody. The wheel wells are located on either side of the panel 36, and extend downward from the panel (in the view shown in FIG. 2, but upward when the underbody is right-side up). Between the pair of wheel wells 42 are where the first and second cross-members 32, 38 are located, as well as the second end 24 of the V-brace 16. For additional support, pins 44 can be driven through the frame rails 28, 30 and the cross-member 32 at a location within a length of a respective wheel well. The pins 44 can aid in the securement of the cross-member 32 to the frame rails 28, 30.

Figure 3:
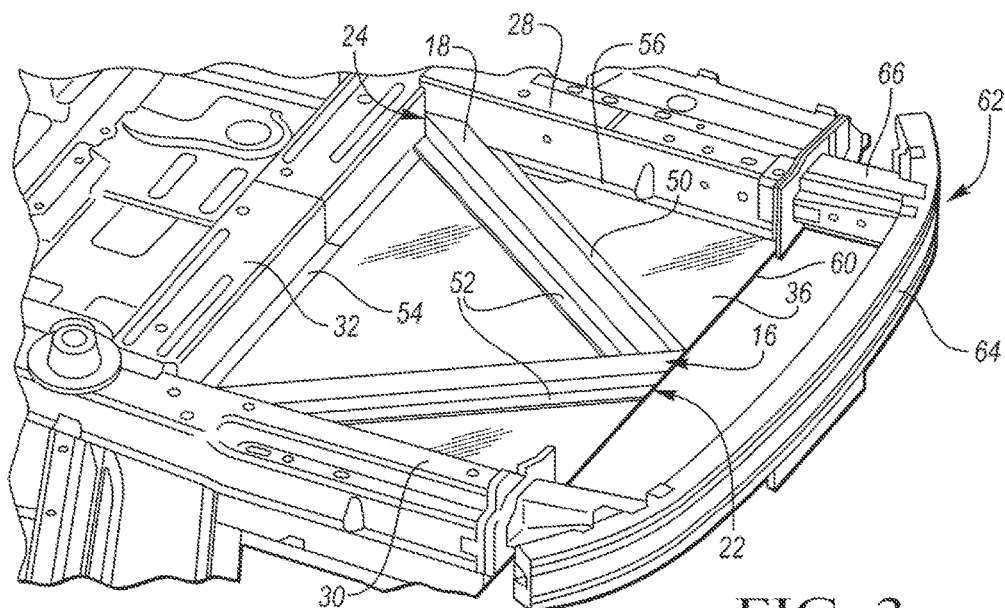
FIG. 3 is a perspective view of the underbody with a rear bumper beam attached to the frame rails via crush cans, according to one embodiment.

Referring to FIG. 3, each leg 18, 20 of the V-brace includes flanges that run along either side of each leg. In particular, each leg 18, 20 includes a first flange 50 and a second flange 52. The flanges 50, 52 are at an upper region of the V-brace 16 such that they are configured to secure to the panel 36 above in a face-to-face relationship. The cross-member 32 also includes a flange 54 that runs along the length of the cross-member. The flange 54 is also located at an upper region of the cross-member 32 such that it is configured to secure to the panel 36 above in a face-to-face relationship. The frame rails 28, 30 also include flanges 56 that run along at least a portion of the length of the frame rails 28, 30 to enable the frame rails to secure to the panel 36 in a face-to-face relationship. At the second end 24 of the V-brace 16, the first flange 50 of each leg of the V-brace overlaps and secures to a respective one of the flanges 56 of the frame rails 28, 30. The second flange 52 of each leg of the V-brace overlaps and secures to the flange 54 of the cross-member. Thus, at the second end 24 of the V-brace 16, a flange-to-flange securing region is provided between the V-brace 16 and the frame rails 28, 30, and between the V-brace 16 and the cross-member 32. Welding or other connecting methods can secure the engaged flanges together.

The flanges 50, 52 provide an increased width of the legs 18, 20. Each leg may have a first width that is secured to the panel 36 on a top of the leg. On a bottom of the leg, the leg may have a second width that is less than the first width. The flanges on the frame rails and the cross-member also provide an increased width where the frame rails and cross-member secure to the panel 36 above.

At the first end 22 of the V-brace 16, the panel 36 ends at edge 60. In the embodiment shown in FIG. 3, the first end 22 of the V-brace generally aligns with the end of the panel 36, as well as the ends of the frame rails 28, 30. The underbody thus ends at the edge 60 of the panel, along with the ends of the frame rails and the V-brace member. Spaced apart from the edge 60 of the panel 36 is a rear bumper assembly 62. The rear bumper assembly 62 includes a bumper beam 64 that is connected to the frame rails 28, 30 via crush cans 66. A void or empty space exists between the rear bumper assembly 62 and the end of the V-brace 16 (and the remaining underbody support structure).

Figure 4:
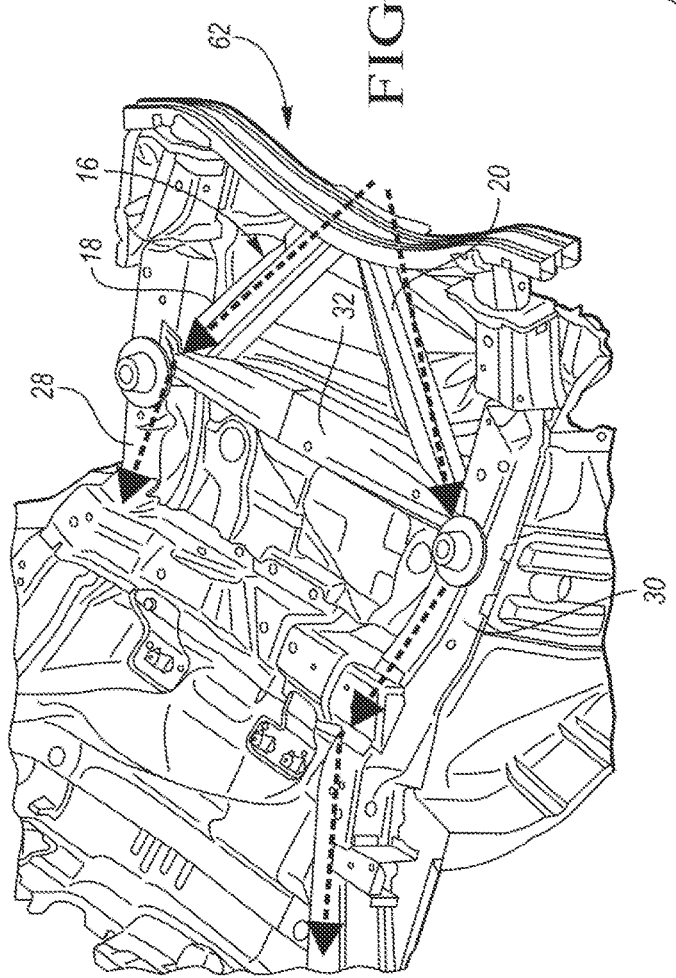
FIG. 4 is a perspective view of the underbody of FIG. 2 after a collision impact, illustrating the direction of load transferring through the underbody, according to one embodiment.

In the event of a collision from the rear of the vehicle, the rear bumper assembly 62 is able to absorb the initial forces and transfer them to the crush cans, which can collapse and crush in upon themselves. Because the void or space exists between the rear bumper assembly 62 and the V-brace 16, the forces are not initially transferred directly to the first end of the V-brace 16. If the collision is strong enough, the force causes the rear bumper assembly 62 to press upon the V-brace 16. The arrows shown in FIG. 4 illustrate the direction of force transfer during a rear collision. The first end 22 of the V-brace 16 receives an impact force from the rear bumper assembly 62. The force then travels along the two legs 18, 20 of the V-brace 16, and to the frame rails 28, 30. This causes the cross-member 32 to experience tension forces that would not be realized if the V-brace was replaced by parallel brace members that were inboard from the frame rails.

Figure 5:
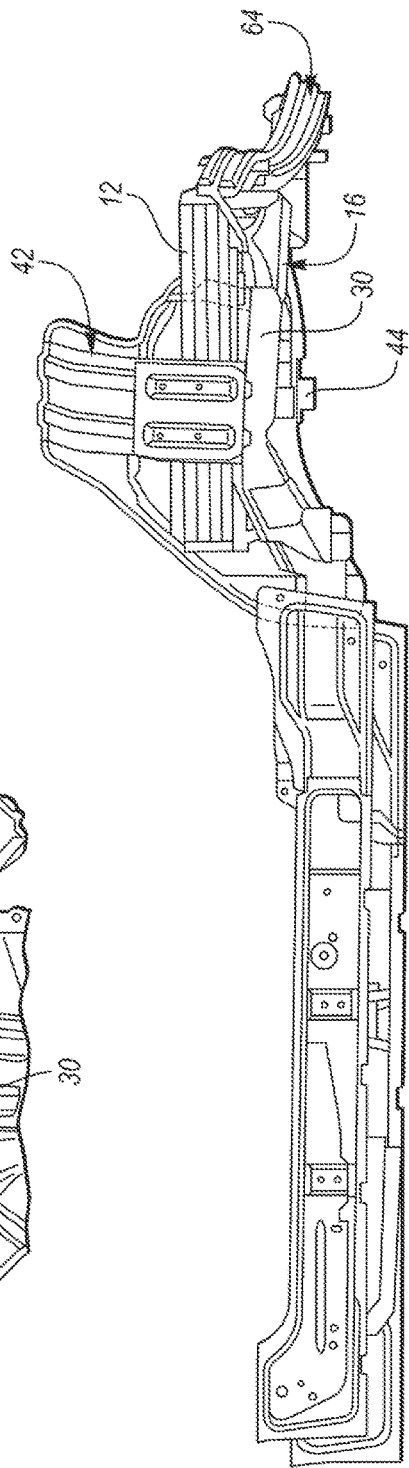
FIG. 5 is a side view of the underbody of the vehicle with a traction battery mounted to the underbody and above the V-brace, according to one embodiment.

FIG. 5 shows a side view of the underbody assembly right-side up. As the vehicle may be a hybrid-electric vehicle, a traction battery 12 is disposed above the floor panel 36 in a location directly above the V-brace 16. The V-brace 16 transfers the forces from the collision such that they are separated towards the frame rails 28, 30, thus preserving the battery 12 and inhibiting displacement of the battery 12.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle comprising:
a rear bumper beam;
a pair of frame rails secured to the bumper beam;
a cross-member connecting the frame rails;
a V-brace having two legs with first ends that intersect and second ends that are spaced apart, each of the first ends being secured to the other of the legs, and each of the second ends being secured directly to the cross-member and one of the frame rails;
a floor panel ending in a rear edge aligned with the first ends such that a gap exists between the bumper beam and the aligned first ends and floor panel; and
one or more additional cross-members connecting the frame rails, wherein the V-brace is secured to the cross-member and not to the additional cross-members.

2. The vehicle of claim 1, wherein the floor panel is secured above the frame rails, the cross-member, and the V-brace, and wherein the vehicle further comprises a traction battery secured above the floor panel at a location vertically aligned with the V-brace.

3. The vehicle of claim 1, wherein the cross-member includes a flange extending along a length of the cross-member, and each of the legs includes a first flange extending along a length thereof that is secured to the flange of the cross-member.

4. The vehicle of claim 3, wherein the frame rails each include a flange extending along a length thereof, and each of the legs includes a second flange extending along the length thereof that is secured to the flange of one of the frame rails in a vertically overlapping fashion.

5. The vehicle of claim 1, wherein the cross-member includes two half-members secured to one another, and each of the legs is secured to one of the two half-members.

6. The vehicle of claim 1, wherein each of the legs has an upper side and a lower side, the upper side is secured to a floor panel and has a first width, and the lower side is spaced from the upper side and has a second width less than the first width.

7. The vehicle of claim 6, wherein the first end of the V-brace is defined by an intersection of the two legs, and the first end has a width less than the first width of the upper side of each of the legs.

8. The vehicle of claim 1, wherein the frame rails, the cross-member, the V-brace, and the floor panel are collectively part of a vehicle underbody, wherein the underbody ends at the rear edge of the floor panel such that no part of the underbody is provided in the gap.

9. A vehicle frame structure, comprising:
frame rails having longitudinally-extending flanges;
a rear bumper beam coupled to the frame rails via crush cans;
a cross-member coupled to the frame rails; and
two V-brace members each having:
first ends intersecting forward of the crush cans and spaced apart from the bumper beam, and
second ends spaced apart and each directly connecting with the cross-member and one of the flanges of the frame rails in vertically overlapping fashion.

10. The frame structure of claim 9, further comprising a floor panel having a first surface and an opposing second surface, wherein the first surface is secured to the frame rails, the cross-member, and the V-brace members, and the second surface is configured to support a traction battery at a location vertically aligned with at least a portion of the V-brace members.

11. The frame structure of claim 9, wherein the cross-member includes a flange extending along a length of the cross-member, and each of the V-brace members includes a first flange extending between the bumper beam and the cross-member and secured to the flange of the cross-member.

12. The frame structure of claim 9, further comprising one or more additional cross-members connecting the frame rails, wherein the NT-brace members are secured to the cross-member and not to the additional cross-members.

13. The frame structure of claim 9, wherein the cross-member includes two half-members secured to one another, and each of the V-brace members is secured to one of the two half-members.

14. The vehicle of claim 9, wherein each of the V-brace members has an upper side and a lower side, the upper side is secured to a floor panel and has a first width, and the lower side has a second width less than the first width.

15. The vehicle of claim 14, wherein the first ends of the V-brace members intersect to define a width that is less than the first width of the upper side of each of the V-brace members.

* * * * *